(12) United States Patent
Bhattacharyya et al.

(10) Patent No.: US 11,089,334 B1
(45) Date of Patent: Aug. 10, 2021

(54) METHODS AND SYSTEMS FOR MAINTAINING QUALITY OF EXPERIENCE IN REAL-TIME LIVE VIDEO STREAMING

(71) Applicant: Tata Consultancy Services Limited, Mumbai (IN)

(72) Inventors: Abhijan Bhattacharyya, Kolkata (IN); Ashis Sau, Kolkata (IN); Madhurima Ganguly, Kolkata (IN); Balamuralidhar Purushothaman, Bangalore (IN); Arpan Pal, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 17/117,579

(22) Filed: Dec. 10, 2020

(30) Foreign Application Priority Data

Aug. 26, 2020 (IN) .............................. 202021036740

(51) Int. Cl.
*H04N 7/12* (2006.01)
*H04N 19/66* (2014.01)
(Continued)

(52) U.S. Cl.
CPC ........... *H04N 19/66* (2014.11); *H04N 19/119* (2014.11); *H04N 19/132* (2014.11);
(Continued)

(58) Field of Classification Search
CPC ...... H04N 19/66; H04N 19/172; H04N 19/70; H04N 19/895; H04N 19/188;
(Continued)

(56) References Cited

U.S. PATENT DOCUMENTS

| 10,419,502 | B2 | 9/2019 | Bao et al. | |
|---|---|---|---|---|
| 2015/0350287 | A1* | 12/2015 | Novo Diaz | H04L 67/42 |
| | | | | 709/203 |
| 2019/0253475 | A1* | 8/2019 | Bhattacharyya | H04L 65/602 |

FOREIGN PATENT DOCUMENTS

| EP | 3528469 A1 | 8/2019 |
|---|---|---|
| WO | WO 2017/069891 A1 | 4/2017 |

OTHER PUBLICATIONS

Krawiec, Piotr, et al. "DASCo: dynamic adaptive streaming over CoAP." Multimedia Tools and Applications 77.4 (2018): 4641-4660.

* cited by examiner

*Primary Examiner* — Richard T Torrente
(74) *Attorney, Agent, or Firm* — Finnegan, Henderson, Farabow, Garrett & Dunner, LLP

(57) ABSTRACT

The disclosure generally relates to methods and systems for maintaining quality of experience (QoE) in real-time live video streaming. Conventional techniques in achieving the QoE employ either additional bandwidth of the network or compromise on a latency of the network. The present disclosure provides a rendering algorithm to compensate for lost entropy without attempting to regain exact lost packet(s) information. The rendering algorithm enhance the QoE by regaining structural continuity of the lost packet(s) information despite variations in the end-to-end transmission channel. A segmentation algorithm is employed to segment each frame into one or more packets, so that each packet should only have integer number of MCU blocks. The rendering algorithm to identify the lost packets and to compensate the lost information. The present disclosure provides a loss resilient solution to maintain the QoE without trading off the bandwidth efficiency and the network latency.

9 Claims, 9 Drawing Sheets

(51) Int. Cl.
*H04N 19/172* (2014.01)
*H04N 19/176* (2014.01)
*H04N 19/46* (2014.01)
*H04N 19/895* (2014.01)
*H04N 19/169* (2014.01)
*H04N 19/132* (2014.01)
*H04N 19/70* (2014.01)
*H04N 19/119* (2014.01)

(52) U.S. Cl.
CPC ......... *H04N 19/172* (2014.11); *H04N 19/176* (2014.11); *H04N 19/188* (2014.11); *H04N 19/46* (2014.11); *H04N 19/70* (2014.11); *H04N 19/895* (2014.11)

(58) Field of Classification Search
CPC .. H04N 19/176; H04N 19/132; H04N 19/119; H04N 19/46
See application file for complete search history.

METHODS AND SYSTEMS FOR MAINTAINING QUALITY OF EXPERIENCE IN REAL-TIME LIVE VIDEO STREAMING

PRIORITY CLAIM

This U.S. patent application claims priority under 35 U.S.C. § 119 to: Indian Patent Application No. 202021036740, filed on 26 Aug. 2020. The entire contents of the aforementioned application are incorporated herein by reference.

TECHNICAL FIELD

The disclosure herein generally relates to the field of real-time video streaming, and, more particularly, to methods and systems for maintaining quality of experience (QoE) in real-time live video streaming.

BACKGROUND

Quality of Experience (QoE) in real-time video streaming is considered to be an important parameter for augmented reality (AR) applications such as tele-presence and tele-operation. Some of the AR applications, especially that are time critical or delay critical in nature, include tele-medicine, search and rescue operations, and so on. The above mentioned AR applications demand receiving visual content not only with a good quality but also at the right time, for meeting the QoE more stringent than normal applications that are not time critical or delay critical in nature. For example, in the search and rescue operations, visual feedback (content) from a remote end device (for example, drone) is so critical for timely emanation of kinetic commands by a human controlling the remote end device through a master device (for example, a computing device). The visual feedback must be a faithful representation of a remote environment captured by the remote end device, despite variations in an end-to-end transmission channel between the remote end device and the master device. The variations in the end-to-end transmission channel may be due to poor network or signal quality, a low network bandwidth, and so on.

Conventional techniques in achieving the QoE may use either additional bandwidth of the network or compromise on a latency of the network. As both the additional bandwidth of the network and the latency of the network are divergent in nature, achieving the QoE is always a challenging task.

SUMMARY

Embodiments of the present disclosure present technological improvements as solutions to one or more of the above-mentioned technical problems recognized by the inventors in conventional systems.

In an aspect, there is provided a processor-implemented method comprising the steps of: receiving a real-time video being acquired by a video acquisition unit installed at a video producing unit; encoding, via the one or more hardware processors, the real-time video, to obtain one or more encoded frames, using an encoding technique, wherein each encoded frame of the one or more encoded frames comprises one or more minimum coded unit (MCU) blocks indicating encoded visual information, and a metadata; segmenting, each encoded frame into one or more packets using a segmentation algorithm, wherein each packet of the one or more packets comprises an integer number of MCU blocks with a packet size, wherein the maximum packet size of each packet is limited by a maximum transmission unit (MTU) size; identifying one or more critical packets and one or more non-critical packets from the one or more packets, based on the metadata present in the one or more packets, wherein the one or more critical packets are critical for rendering the real-time video at a video consuming unit; transmitting the one or more critical packets and the one or more non-critical packets, over a network communication channel.

In another aspect, there is provided a system comprising: one or more hardware processors; one or more Input/Output (I/O) interfaces; and the memory operatively coupled to one or more hardware processors for storing instructions configured for execution by the one or more hardware processors, the instructions being comprised in a video producing unit configured to: receive a real-time video being acquired by a video acquisition unit; encode the real-time video, to obtain one or more encoded frames, using an encoding technique, wherein each encoded frame of the one or more encoded frames comprises one or more minimum coded unit (MCU) blocks indicating encoded visual information, and a metadata; segment each encoded frame into one or more packets using a segmentation algorithm, wherein each packet of the one or more packets comprises an integer number of MCU blocks with a packet size, wherein the maximum packet size of each packet is limited by a maximum transmission unit (MTU) size; identify one or more critical packets and one or more non-critical packets from the one or more packets, based on the metadata present in the one or more packets, wherein the one or more critical packets are critical for rendering the real-time video at a video consuming unit; and transmit the one or more critical packets and the one or more non-critical packets, over a network communication channel.

In yet another aspect, there is provided a computer program product comprising a non-transitory computer readable medium having a computer readable program embodied therein, wherein the computer readable program, when executed on a computing device, causes the computing device to: receive a real-time video being acquired by a video acquisition unit; encode the real-time video, to obtain one or more encoded frames, using an encoding technique, wherein each encoded frame of the one or more encoded frames comprises one or more minimum coded unit (MCU) blocks indicating encoded visual information, and a metadata; segment each encoded frame into one or more packets using a segmentation algorithm, wherein each packet of the one or more packets comprises an integer number of MCU blocks with a packet size, wherein the maximum packet size of each packet is limited by a maximum transmission unit (MTU) size; identify one or more critical packets and one or more non-critical packets from the one or more packets, based on the metadata present in the one or more packets, wherein the one or more critical packets are critical for rendering the real-time video at a video consuming unit; and transmit the one or more critical packets and the one or more non-critical packets, over a network communication channel.

In an embodiment, the computer readable program further causes the computing device to: parse the one or more critical packets and the one or more non-critical packets received from the video producing unit; reconstruct the real-time video while playing-out at the video consuming unit, by storing the one or more critical packets and the one or more non-critical packets in a play-out buffer in an order received, using a rendering algorithm, to maintain a Quality of Experience (QoE) of the real-time video, where in the rendering algorithm comprises: identifying one or more missing non-critical packets out of the one or more non-critical packets, based on an associated position indicator corresponding to an associated timestamp; identifying one or more missing MCU blocks associated with each missing non-critical packet, based on a payload specific header of the next non-critical packet successfully received and the payload specific header of the previous non-critical packet successfully received; compensating DC components of each missing MCU block with encoded zeros, while decoding, to obtain corresponding filled MCU blocks and corresponding filled non-critical packets, wherein the encoded zeros are obtained from the corresponding critical packet, and the filled non-critical packets are used for near-faithful structural restoration of the encoded frame after the decoding; and replacing the one or more missing non-critical packets with the respective filled non-critical packets, in the play-out buffer.

In an embodiment, the video producing unit is further configured to segment each encoded frame into the one or more packets using the segmentation algorithm, by: initializing a packet buffer with a current packet size, for a current packet, wherein a maximum current packet size is limited to the maximum transmission unit (MTU) size; truncating remaining metadata at a current packet boundary and leaving rest of the remaining metadata for putting in a next packet, if a sum of the current packet size and a remaining metadata size is greater than the maximum current packet size, else putting the remaining metadata in the current packet; discarding a next MCU block for putting in the next packet and inserting padding bits for byte alignment to the current packet, if: (i) the next MCU block is available, and (ii) a sum of the current packet size and a next MCU block size is greater than the maximum current packet size; and putting the next MCU block in the current packet, if the sum of the current packet size and the next MCU block size is less than or equal to the maximum current packet size.

In an embodiment, the video producing unit is further configured to transmit the one or more critical packets and the one or more non-critical packets, by utilizing an application protocol with one of the header fields having a header_option to indicate a presence of a payload specific header which comprises two unsigned 16-bit fields each indicating a start_MCU_index and an end_MCU_index, and an unsigned 8-bit field for indicating a padded_bit_length for byte-alignment.

In an embodiment, the video producing unit is further configured to identify one or more critical packets and the one or more non-critical packets from the one or more packets, by identifying each packet having the metadata as a critical packet and identifying each packet not having the metadata as a non-critical packet.

In an embodiment, the system described herein above further comprises a video consuming unit configured to: parse the one or more critical packets and the one or more non-critical packets received from the video producing unit; and reconstruct the real-time video while playing-out at the video consuming unit, by storing the one or more critical packets and the one or more non-critical packets in a play-out buffer in an order received, using a rendering algorithm, to maintain a Quality of Experience (QoE) of the real-time video, where in the rendering algorithm comprises: identifying one or more missing non-critical packets out of the one or more non-critical packets, based on an associated position indicator corresponding to an associated timestamp; identifying one or more missing MCU blocks associated with each missing non-critical packet, based on a payload specific header of the next non-critical packet successfully received and the payload specific header of the previous non-critical packet successfully received; compensating DC components of each missing MCU block with encoded zeros, while decoding, to obtain corresponding filled MCU blocks and corresponding filled non-critical packets, wherein the encoded zeros are obtained from the corresponding critical packet, and the filled non-critical packets are used for near-faithful structural restoration of the encoded frame after the decoding; and replacing the one or more missing non-critical packets with the respective filled non-critical packets, in the play-out buffer.

It is to be understood that both the foregoing general description and the following detailed description are exemplary and explanatory only and are not restrictive of the embodiments of the present disclosure, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Typical Augmented Reality (AR) applications such as tele-presence and tele-operation applications demand the visual content to be received not only with a good quality but also in real time, to meet Quality of Experience (QoE). The AR applications especially that are time critical or delay critical such as tele-medicine, search and rescue operations, and so on, demand the QoE more stringent than normal AR applications. The said AR applications consider the quality of visual content received in the real time, as critical information for taking next course of action. But a capability to maintain the QoE, despite time varying capacity of an end-to-end transmission channel, is important in terms of ensuring the QoE of the overall application.

Figure 1:
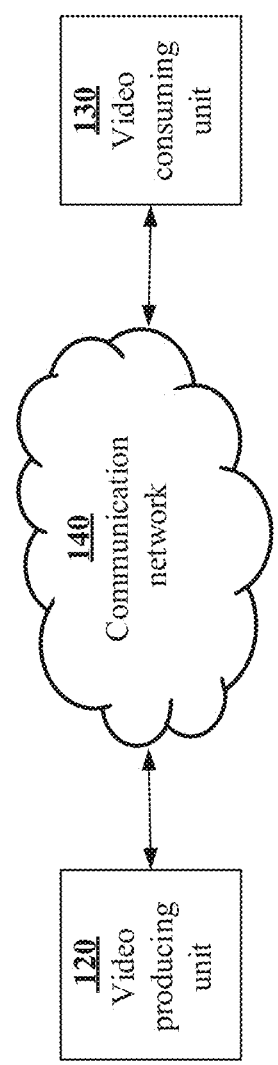
FIG. 1 illustrates an exemplary application scenario for methods and systems of the present disclosure.

FIG. 1 illustrates an exemplary application scenario for methods and systems of the present disclosure. In the exemplary application scenario of FIG. 1, a video producing unit 120, a video consuming unit 130, and a communication network 140 having the end-to-end transmission channel are present. The video producing unit 120 may be a remote end device such as a robot including a humanoid robot or an avatar, a drone and a like based on the application. For example, the video producing unit 120 is a drone in case of search and rescue applications, the robot may be in the form of avatar in case of tele-medicine applications, and so on. In another embodiment, the video producing unit 120 may be a constrained device with limited resources. The video producing unit 120 may have to move around in the remote environment with lossy connectivity marred with frequently intermittent connections through the time varying end-to-end transmission channel. The intermittence may occur both in indoor or in outdoor conditions due to radio impairments through shadowing, destructive interference, etc. and also due to congestion in the communication network 140. The video producing unit 120 may be present at remote end and may be configured to acquire the visual information of the remote environment and transmit the visual information of the remote environment over the end-to-end transmission channel to the video consuming unit 130.

In an embodiment, the video consuming unit 130 may be a master device such as a computing device operated by a human, an intelligent machine-learning unit, and so on. In another embodiment, the video consuming unit 130 may be a server, desktop computer, laptops, portable computers, smart phone device, and so on. In an embodiment, the video consuming unit 130 may include associated electronic assembly to view the visual information of the remote environment sent by the video producing unit 120 and send kinematic control commands to the video producing unit 120, based on a situation. The kinematic control commands are essentially real-time, tightly synchronized reactions against a contextual inference perceived by the video consuming unit 130 from the visual information sent by the video producing unit 120.

Continuous visual information of the remote environment are practically manifested by the video producing unit 120 through a captured time-series of discrete video frames: $\Gamma\_A=\{<f_i, t_i>\}$ for $i=\{0, 1, 2, \ldots\}$, where $f_i$ is the visual information captured at $i^{th}$ time instant $t_i$ which is strictly bounded by the frame-rate R such that $t_{i+1}-t_i=R^{-1}$. The video consuming unit 130 may receive the discrete video frames and render the discrete time-series $\Gamma\_M=\{<\tilde{f}_i, \tilde{t}_i>\}$ where $\tilde{f}_i$ is the representation of information corresponding to $f_i$ at a delayed local time reference $\tilde{t}_i$ at the video consuming unit 130. Ideally, the video consuming unit 130 has to maintain a same bounding condition as the video producing unit 120, for rendering at play-out. The bounding condition may be expressed in a below equation:

$$\tilde{t}_{i+1}-\tilde{t}_i=R^{-1} \qquad (1)$$

where $R^{-1}$ defines a play-out interval for the video consuming unit 130.

The bounding condition mentioned in equation 1 is important for the concerned AR applications, as the visual information captured in each video frame is tightly coupled with a snapshot of the remote environment at a given time and a relationship must be maintained in the relative local time reference of the video consuming unit 130. Let, $I(\Gamma\_A)$ is the visual information in $\Gamma\_A$ and $I(\Gamma\_M)$ is that for $\Gamma\_M$. The QoE is directly related to the amount of the visual information rendered at the video consuming unit 130 and is ensured by a below condition:

$$\Delta I=|I(\Gamma\_A)-I(\Gamma\_M)|\rightarrow 0 \qquad (2)$$

To satisfy the above condition (2), for each i, the below condition to be satisfied:

$$\Delta f_i=|f_i-\tilde{f}_i|\rightarrow 0 \qquad (3)$$

Since, the conditions (2) and (3) must be satisfied in conjunction with bounding condition (1), a paradox may arise considering practicalities of the time varying end-to-end transmission channel. Under lossy conditions and especially when a channel capacity is degrading, maintaining the condition (3) would require more exchanges over the end-to-end transmission channel to recover lost information using error correction techniques such as a backward error correction (BEC), or pump more bits into the end-to-end transmission channel for a Forward Error Correction (FEC). This may add to the latency which leads to deviation from the bounding condition (1). Adaptive bit rate schemes running on strictly reliable transports such as a Transmission Control Protocol (TCP), may undermine the QoE as $\Delta I$ increase due to degrading the information to maintain the bit-rate. Best-effort real-time streaming techniques may prioritize the bounding condition (1), but at the same time may not achieve the conditions (2) and (3), as no attempt is made to recover the lost information and thus $\Delta I$ increases. Also, in a jittery channel, strictly maintaining the bounding condition (1) may lead to increase in $\Delta fi$ as information segments corresponding to $f_i$ might be delayed than the play-out deadline causing poorly constructed $\tilde{f}_i$.

Applicant in the Indian patent application number 201821005659 (titled ADAPTIVE RESTful REAL-TIME LIVE MEDIA STREAMING), partially addressed to achieve the QoE, by using an Adaptive RESTful Real-time Live Streaming for Things (here after referred as A-REaL-iST) as an application protocol to carry the video stream. The A-REaLiST tries to maintain a balance between a reliability and a real-time delivery. The A-REaLiST infer criticality of the information segment on the fly and delivers that information segment through reliable or unreliable (best-effort) semantics for critical and non-critical information segments respectively. For a given $f_i$ there may be a higher probability ($P_R$) of receiving the critical information segments $f_{i\_crit}$. Similarly, there may be much a lower probability ($P_L$) of receiving the non-critical information segments $f_{i\_non\text{-}crit}$ due to best effort delivery under lossy conditions arising out of packet loss or jitter in the end-to-end transmission channel. A naïve reconstruction technique provided in the A-REaLiST may not take care of this pocket loss and may not take associate actions while rendering before the play-out. Hence maintaining the QoE is still the challenging aspect. The naïve reconstruction technique provided in the A-REaLiST for Motion JPEG (MJPEG) stream, is mentioned in below equation:

$$\hat{f}_i = (P_R \times f_{i\_crit})(P_L \times f_{i\_non\text{-}crit}) \quad (4)$$

The present disclosure herein provides methods and systems that solves the technical problem of maintaining the QoE in the real-time video streaming is achieved without the additional bandwidth and without degrading the latency. The present disclosure provides an effective rendering mechanism at the video consuming unit 130 to compensate for lost entropy without attempting to regain exact lost packet(s) information. The effective rendering mechanism enhances the QoE by regaining structural continuity of the lost packet(s) information despite variations in the end-to-end transmission channel.

Referring now to the drawings, and more particularly to FIG. 2 through FIG. 8, where similar reference characters denote corresponding features consistently throughout the figures, there are shown preferred embodiments and these embodiments are described in the context of the following exemplary systems and/or methods.

Figure 2:
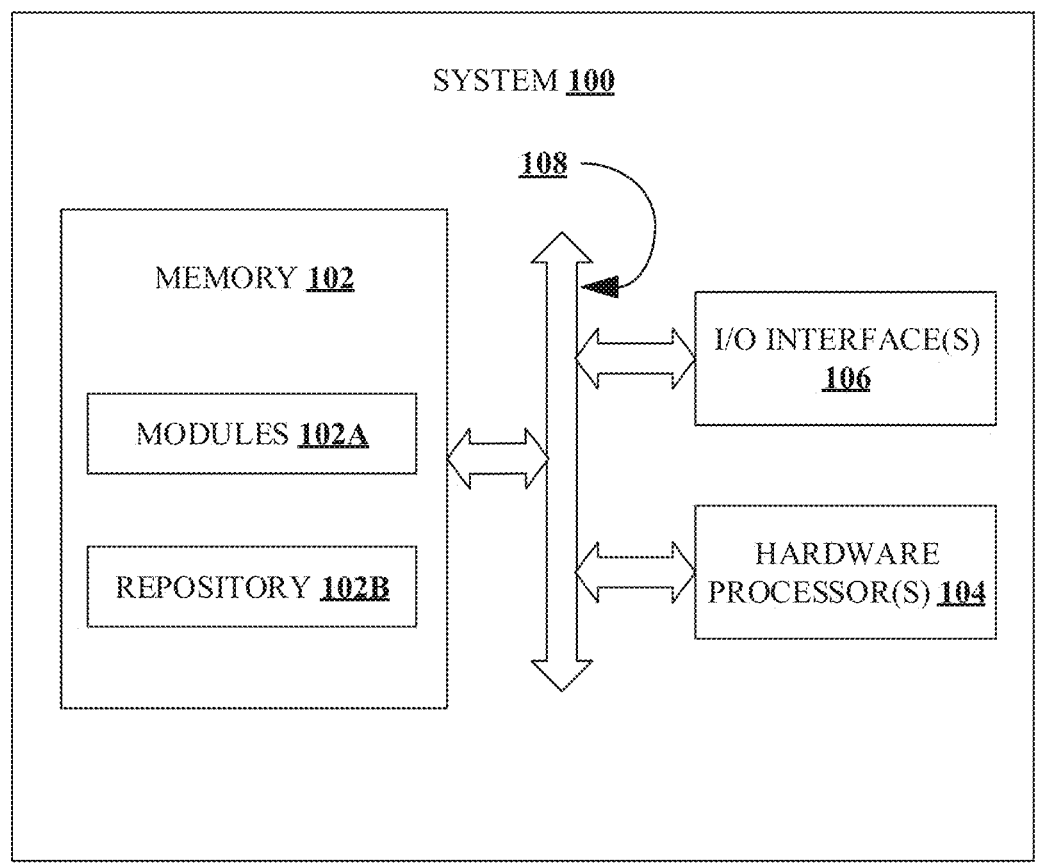
FIG. 2 illustrates an exemplary block diagram of a system for maintaining quality of experience (QoE) in real-time live video streaming, in accordance with some embodiments of the present disclosure.

FIG. 2 is an exemplary block diagram of a system 100 for maintaining quality of experience (QoE) in real-time live video streaming, in accordance with some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computer, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102a and a repository 102b for storing data processed, received, and generated by one or more of the plurality of modules 102a. The plurality of modules 102a may include routines, programs, objects, components, data structures, and so on, which perform particular tasks or implement particular abstract data types.

The plurality of modules 102a may include programs or computer-readable instructions or coded instructions that supplement applications or functions performed by the system 100. The plurality of modules 102a may also be used as, signal processor(s), state machine(s), logic circuitries, and/or any other device or component that manipulates signals based on operational instructions. Further, the plurality of modules 102a can be used by hardware, by computer-readable instructions executed by the one or more hardware processors 104, or by a combination thereof. In an embodiment, the plurality of modules 102a can include various sub-modules (not shown in FIG. 1). Further, the memory 102 may include information pertaining to input(s)/output(s) of each step performed by the processor(s) 104 of the system 100 and methods of the present disclosure.

The repository 102b may include a database or a data engine. Further, the repository 102b, amongst other things, may serve as a database or includes a plurality of databases for storing the data that is processed, received, or generated as a result of the execution of the plurality of modules 102a. Although the repository 102a is shown internal to the system 100, it will be noted that, in alternate embodiments, the repository 102b can also be implemented external to the system 100, where the repository 102b may be stored within an external database (not shown in FIG. 1) communicatively coupled to the system 100. The data contained within such external database may be periodically updated. For example, new data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102b may be distributed between the system 100 and the external database.

In an embodiment, the system 100 is configured to store instructions configured for execution of steps of a method 200 by the one or more hardware processors 104. In an embodiment, the one or more hardware processors 104 may be implemented in the video producing unit 120, and in the video consuming unit 130.

Figure 3A:
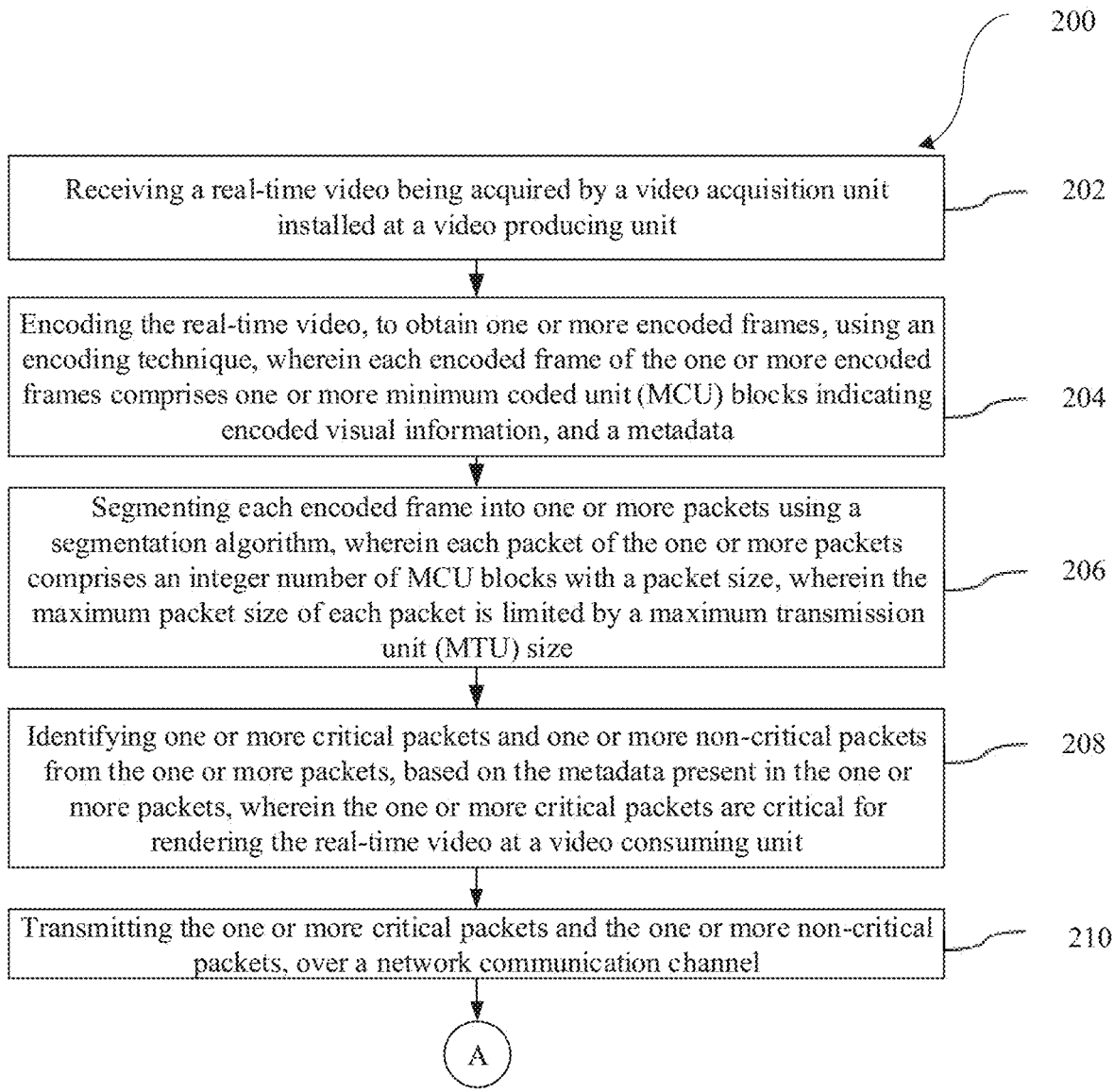
FIG. 3A and FIG. 3B illustrate exemplary flow diagrams of the processor-implemented method for maintaining quality of experience (QoE) in real-time live video streaming, in accordance with some embodiments of the present disclosure.
Figure 3B:
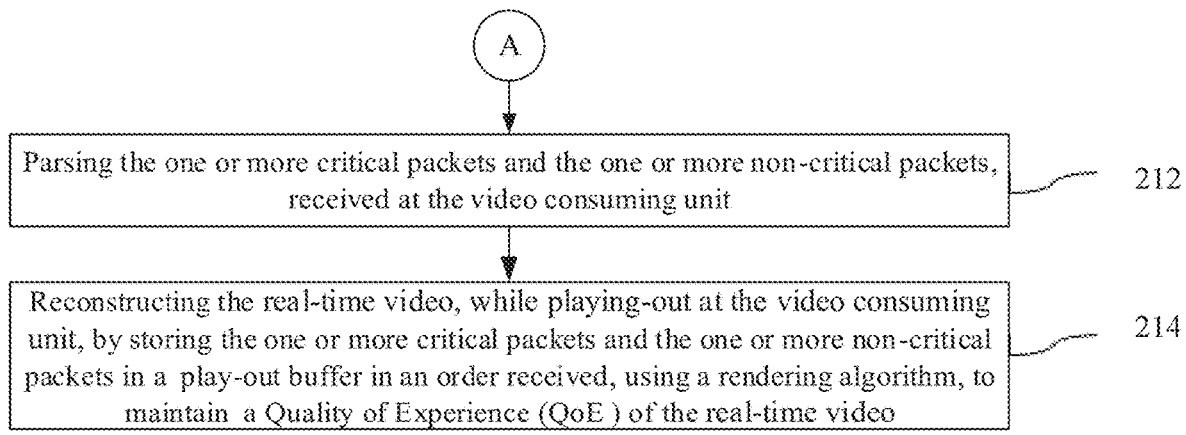

FIG. 3A and FIG. 3 are exemplary flow diagrams illustrating a computer implemented method 200 for maintaining quality of experience (QoE) in real-time live video streaming, in accordance with some embodiments of the present disclosure. The steps of the method 200 will now be explained in detail with reference to the components of the system 100 of FIG. 2 and FIG. 3A through FIG. 8. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

At step 202 of the method 200, the video producing unit 120 is configured to receive a real-time video being acquired by a video acquisition unit. In an embodiment, the video acquisition unit may be installed in the video producing unit 120. The real-time video may include a scene of the remote environment that the video acquisition unit has to be captured.

At step 204 of the method 200, the video producing unit 120 is configured to encode the real-time video, to obtain one or more encoded frames. Each encoded frame of the one or more encoded frames comprises one or more minimum coded unit (MCU) blocks indicating encoded visual information and a metadata. In an embodiment, a video encoding technique such as JPEG encoding may be used for encoding the real-time video. The JPEG encoding includes an entropy encoder such as Huffman encoder for encoding each frame present in the real-time video. Each frame in the real-time video (for example, an MJPEG stream), after encoding, essentially consists of required meta-data for identifying essential markers, quantization and entropy encoding (Huffman encoding) tables to decode the encoded frame. Rest of the encoded frame consists of MCU (Minimum Coded Unit) blocks containing a preprocessed, a quantized and an entropy encoded colour-space information in DCT (Discrete Cosine Transform) domain. Each MCU block contains average DPCM (Differential Pulse Code Modulation) encoded DC components for the entire MCU block indicating the block-by-block change in average values of Y (brightness), $C_b$ (blue component) and $C_r$ (red component). Time varying AC coefficients in the MCU block may be encoded by Run Length Encoding (RLE) (For example).

At step 206 of the method 200, the video producing unit 120 is configured to segment each encoded frame obtained at step 204 of the method 200, into one or more packets using a segmentation algorithm. The segmentation algorithm of the present disclosure ensure that each packet comprises an integer number of MCU blocks and a maximum packet size of each packet is limited by a maximum transmission unit (MTU) size of the end-to-end transmission channel. The segmentation algorithm also ensure that each packet boundary aligns with an MCU block boundary. If the MCU block is segmented across two packets, then under a lossy condition, identifying an exact sequence of lost MCU blocks, from an index of lost packets may not possible. The A-REaLiST uses a simple segmentation algorithm and does not ensure dealing with the packet loss.

Each packet includes a packet size. During the segmentation, a packet buffer is initialized with a current packet size, for a current packet. A maximum current packet size is limited to the maximum transmission unit (MTU) size. If metadata is still remaining from a previous packet, then such remaining metadata is considered for inclusion in the current packet. If a sum of the current packet size and a remaining metadata size is greater than the maximum current packet size, then the remaining metadata is truncated at a current packet boundary and leaving rest of the remaining metadata for putting in a next packet. Else the remaining metadata is directly included in the current packet.

While including MCU blocks in the packet buffer, if the next MCU block is available, and a sum of the current packet size and a next MCU block size is greater than the maximum current packet size, then such next MCU block is considered for putting in the next packet rather than in the current packet. The current packet is then included with a set of padding bits to get byte alignment to the current packet. If the sum of the current packet size and the next MCU block size is less than or equal to the maximum current packet size, then the next MCU block is included in the current packet. A key objective of the segmentation algorithm in the present disclosure is to ensure that each packet should include the integer number of MCU blocks. This in other words ensure that no MCU block is fragmented across two packets. Each packet is considered as a payload while transmitting the packets.

Figure 4:
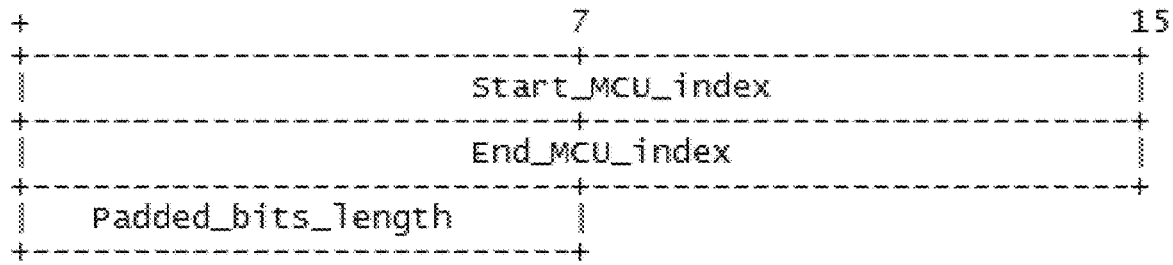
FIG. 4 shows a bit map of a payload specific header, in accordance with some embodiment of the present disclosure.

To keep track of the MCU blocks present in each packet, a payload specific header is used in the present disclosure. The payload specific header includes two unsigned 16-bit fields each indicating a 'start_MCU_index' and an 'end_MCU_index', and an unsigned 8-bit field for indicating 'padded_bit_length'. The 'padded_bit_length' is used to keep track of how many bits have been padded to byte align the payload. FIG. 4 shows a bit map of payload specific header, in accordance with some embodiment of the present disclosure.

At step 208 of the method 200, the video producing unit 120 is configured to identify one or more critical packets and one or more non-critical packets, from the one or more packets obtained after segmentation performed at step 206 of the method 200. The one or more critical packets and the one or more non-critical packets are identified based on the metadata present in the one or more packets. In an embodiment, the packets having the metadata are considered to be the critical packets. Rest of the packets not having the metadata but including the entropy encoded pixel information are considered to be non-critical packets. Such one or more critical packets and one or more non-critical packets are identified from the one or more packets. The one or more critical packets are critical and important for rendering the real-time video at the video consuming unit 130.

At step 210 of the method 200, the video producing unit 120 is configured to transmit the one or more critical packets and the one or more non-critical packets, over a network communication channel. The network communication channel is the end-to-end transmission channel through which the video producing unit 120 and the video consuming unit 130 may connect and interact with each other.

In an embodiment, an application protocol may be utilized in the network communication channel for transmitting the one or more critical packets and the one or more non-critical packets. The application protocol may be a RESTful application protocol which may transmit the one or more critical packets and the one or more non-critical packets, as RESTful requests.

In an embodiment, the RESTful application protocol may be a protocol of A-REaLiST built on Constrained Application Protocol (CoAP) mentioned in the patent application number 201821005659 of the applicant. Semantics of the RESTful application protocol may be adapted to transmit the one or more critical packets as reliable requests with a guaranteed delivery and transmit the one or more non-critical packets as unreliable requests with best-effort delivery.

In an embodiment, the application protocol may include one or more header fields out of which one header field may be called as a 'header_option', which may be used to indicate a presence of the payload specific header. For example, in the A-REaLiST, the header field 'Stream_info' may be re-defined to include the header_option. More specifically, a lowest bit of 'Stream_id' component of the header field 'Stream_info' may be used to define the header_option. In addition, an optional header field called as 'payload_type' may be included to specify media types. The media types include media specific entries present in the payload (packet). In an embodiment, a size of the 'payload_type' may be an unsigned byte.

At step 212 of the method 200, the video consuming unit 130 is configured to parse the one or more critical packets and the one or more non-critical packets that are received from the video producing unit 120. The video consuming unit 130 may parse the one or more critical packets and the one or more non-critical packets, may in an order in which they are received from the video producing unit 120.

At step 214 of the method 200, the video consuming unit 130 is configured to reconstruct the real-time video streaming while playing-out, by rendering the one or more critical packets and the one or more non-critical packets using a rendering algorithm, to maintain the QoE of the real-time video streaming. A play-out buffer may be used to store the one or more critical packets and the one or more non-critical packets in an order received. The rendering algorithm may render the one or more critical packets and the one or more non-critical packets that are stored in the play-out buffer, while playing-out.

Under lossy conditions in the end-to-end transmission channel, there may be always a possibility that some packets (one or more) including either the critical packets or non-critical packets or both type of packets, may be lost during the transmission. Since the application protocol ensure of the guaranteed delivery for the critical packets, the possibility of missing the non-critical packets is much higher, as these packets make use of the best-effort delivery during the transmission. If some of the non-critical packets are lost, then reconstructing the real-time video may not be possible with a good quality. The loss of the non-critical packets may essentially loss of the entropy corresponding to the encoded MCU blocks. Since the average colour-space information in each MCU block is differentially encoded, the loss of entropy destroys the decoding chain for the corresponding packet.

Hence the rendering algorithm of the present disclosure first identify one or more missing non-critical packets out of the one or more non-critical packets, based on an associated position indicator corresponding to an associated timestamp. The associated position indicator information and the associated timestamp information may be obtained from corresponding header fields associated with such non-critical packets.

Figure 5:
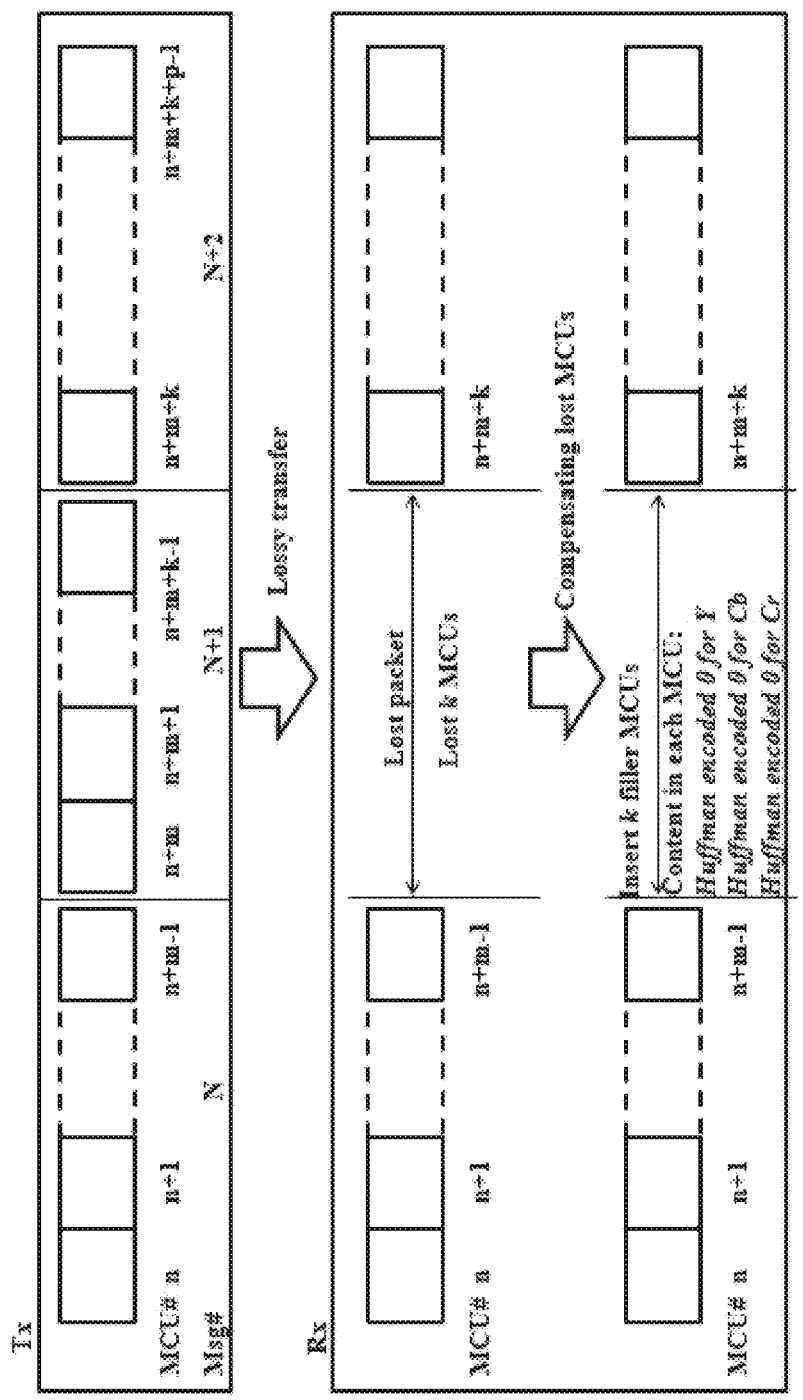
FIG. 5 shows a mechanism for identifying one or more missing minimum coded unit (MCU) blocks associated with each missing non-critical packet for compensation, in accordance with some embodiments of the present disclosure.

If one or more missing non-critical packets are identified, then the rendering algorithm identify one or more missing MCU blocks associated with each missing non-critical packet. The one or more missing MCU blocks for each missing non-critical packet, may be identified, based on the payload specific header of the next non-critical packet successfully received and the payload specific header of the previous non-critical packet successfully received. FIG. 5 shows a mechanism for identifying one or more missing MCU blocks associated with each missing non-critical packet for compensation, in accordance with some embodiments of the present disclosure.

Once an exact number of missing MCU blocks are identified for each missing non-critical packet, the rendering algorithm compensate for the lost entropy such that encoder structure is maintained and a faithful representation of the packet may be constructed despite the losses. The rendering algorithm in the present disclosure, compensate for the DC components of each missing MCU block with entropy encoded zeros (Huffman coded zeros), while decoding, so that the decoder gets to maintain the average values of the transformed colour-space across the lost MCU blocks. The entropy coded zeros may be obtained from the metadata of the corresponding critical packet. As a result, corresponding filled MCU blocks and corresponding filled non-critical packets may be obtained. The filled non-critical packets are indicative of near-faithful structural restoration of the encoded frame after the decoding, to regain the structural continuity of the real-time video while transmitted. The one or more missing non-critical packets are replaced with the respective filled non-critical packets, in the play-out buffer for smooth play-out of the real-time video at the video consuming unit 130.

A complexity of the rendering algorithm may be computed based on a complexity of replacing lost MCU blocks with Huffman encoded zero for 3 colour space (Y, $C_b$, $C_r$) and a complexity for one-time determination of the value of Huffman encoded zeros. The complexity of the rendering algorithm may be expressed as: $C=C_1+C_2=O(N_m*k*3)+O(\log^H)$, where N is a total number of packets for each frame, $N_m$ is a number of missing packets in the frame, k is a number of MCU blocks in each lost packet, and H is a number of symbols in Huffman table. $C_1$ indicate the complexity of replacing lost MCU blocks with Huffman encoded zero for 3 colour space (Y, $C_b$, $C_r$) and $C_2$ indicates the complexity for one-time determination of the value of Huffman encoded zeros. Thus, the rendering algorithm has dominant linear complexity proportional to the number of lost packets in the frame. The end-user of the video consumer (130) may feel the QoE in the real-time video while playing-out, though the MCU blocks are lost. The rendering algorithm ensures to satisfy the condition (2) for the given bounding condition (1).

The rendering algorithm defines a rendering function $\psi(\bullet)$ to compensate for the loss of information and reconstruct the $\tilde{f}_i$ such that the conditions (1), (2) and (3) are satisfied. Thus, $\tilde{f}_i$ may be expressed as:

$$\tilde{f}_i = \psi(P_R \times f_{i\_crit}, P_L \times f_{i\_non-crit}), \text{ where } P_R >> P_L \quad (5)$$

The rendering algorithm ensure to fill all the missing MCU blocks and hence the missing non-critical packets. Hence the methods and systems of the present disclosure reconstruct the faithful representation of the frame despite losses of the MCU blocks. As the methods and systems of the present disclosure make use of all the packets while rendering during the play-out, the QoE of the overall application in real-time video streaming is achieved. Also, the rendering algorithm of the present disclosure enhances the QoE by regaining the structural continuity of the lossy frames (packets) despite variations in the end-to-end transmission channel. This is achieved without trading off the bandwidth efficiency or the latency. Further, the rendering algorithm does not perform computationally intensive inverse Discrete Courier Transforms (DCT), this ensures a low-computation latency and at the same time allowing recovery of the missing packets within strict timelines (deadlines). Hence the QoE of the end user at the consuming unit 130 is enhanced further and the human operator may take time-critical decisions quickly.

In accordance with the embodiments of the present disclosure, the segmentation algorithm segments each frame into the one or more packets, so that each packet should only have the integer number of MCU blocks. Hence the segmentation algorithm ensures that no MCU block is fragmented across two packets. This allow at the video consuming unit 130 to identify the missing MCU blocks for each missing non-critical packet easily and enable the rendering algorithm for compensating the missing MCU blocks.

The methods and systems of the present disclosure provides a loss resilient solution without trading off the bandwidth efficiency and the network latency. Also, the methods and systems of the present disclosure provide a robust solution which reconciles among apparently diverging aspects of the real-time live video delivery for the delay-critical applications and yet improves the overall QoE.

Although the present disclosure is explained for the JPEG frames of the real-time video in MJPEG format (spatially compressed video), the methods and system may be extended to temporally compressed videos as well by improving the QoE of I-frames (standard JPEG frames) under lossy conditions and thereby reducing throttling in play-out.

The present disclosure may be employed in mobile edge computing (MEC) based video distribution architectures in 5G arena. In this case, the rendering algorithm may be implemented at one or more edge computing devices present in the architecture itself. The one or more edge computing devices may render the video streams by compensating the loss in the received frames before distribution to the video consuming unit 130, for improving the collective QoE. The one or more edge computing devices present in the 5G architecture may be one or more virtual computing devices, one or more physical computing devices, or a combination thereof.

The present disclosure is particularly directed to the application protocol which may improve the QoE in real-time video streaming in delay-critical applications having the constrained devices. The segmentation algorithm and the rendering algorithm may be implemented in the application protocols including the CoAP, the A-REaLiST of the applicant, and so on, that are suitable with some adjustments.

Example Scenario:

An experiment has been carried out between the solutions of Real-time Transfer Protocol (RTP), the A-REaLiST, and the present disclosure. R-pi camera assemblies are used as Avatars (video producing units) and Ubuntu PCs as the master device (video consuming units). For each solution, an "R-pi-Ubuntu" pair as "Avatar-Master" combination. All the Avatars are connected to corresponding master devices through Layer-2 switches connected over a gateway Ubuntu PC which acted as the end-to-end network channel emulator. Thus, all the links made to pass through same channel impairments at the same time. All the Avatars are configured to capture the same scene to maintain the information content same through all the channels. For the RTP, a FFmpeg tool is used. For network emulation, Netem is used. A comparative study against different emulated packet loss percentages and jitters is performed. A simple Gilbert's model is used to emulate burst loss for a given overall packet loss percentage. A path MTU (PMTU) is set as 1280 bytes. MJPEG video is transmitted between individual peers with 480×640 VGA frames @5 fps for 15 minutes duration for each emulated network setting. Each set of experiments are carried out for 10 times and the average results is reported in the graphs. Since no transcoding is involved here, a structural similarity (SSIM) is used as QoE metric. Since the SSIM is a full reference metric it satisfies the condition (3) and used as a quantifier of $\Delta f_i$. Effectively, $\Delta_{fi}=1-Si$, where Si is the SSIM corresponding to the $i^{th}$ transmitted frame ($f_i$). $\Delta l$ is measured in terms of average SSIM over the whole sequence of frames received over the given time. Hence, $\Delta l=1-(\Sigma Si)/N$ for $i=\{0, 1, \ldots, N-1\}$ where N is the number of frames transmitted over the experiment duration. Although Peak Signal-to-noise ratio (PSNR) is measured, it is not considered as a QoE metric as explained later. The SSIM is marked as 0 for dropped frames. A threshold value of SSIM is set at 0.9 to consider a frame acceptable in the interest of overall QoE of the video stream. A set of key performance indicators considered are: Percentage of received frames=$(N_{acc}/N)$ %. Information efficiency=$N_{acc}/B$, Avg. SSIM and Avg. frame rate. Here, $N_{acc}$ indicate a number of acceptable frames with SSIM≤0.9, B is bandwidth consumption in terms of total bytes exchanged in the network for the entire duration. The comparison results are explained through FIGS. 6A to 8.

Figure 6A:
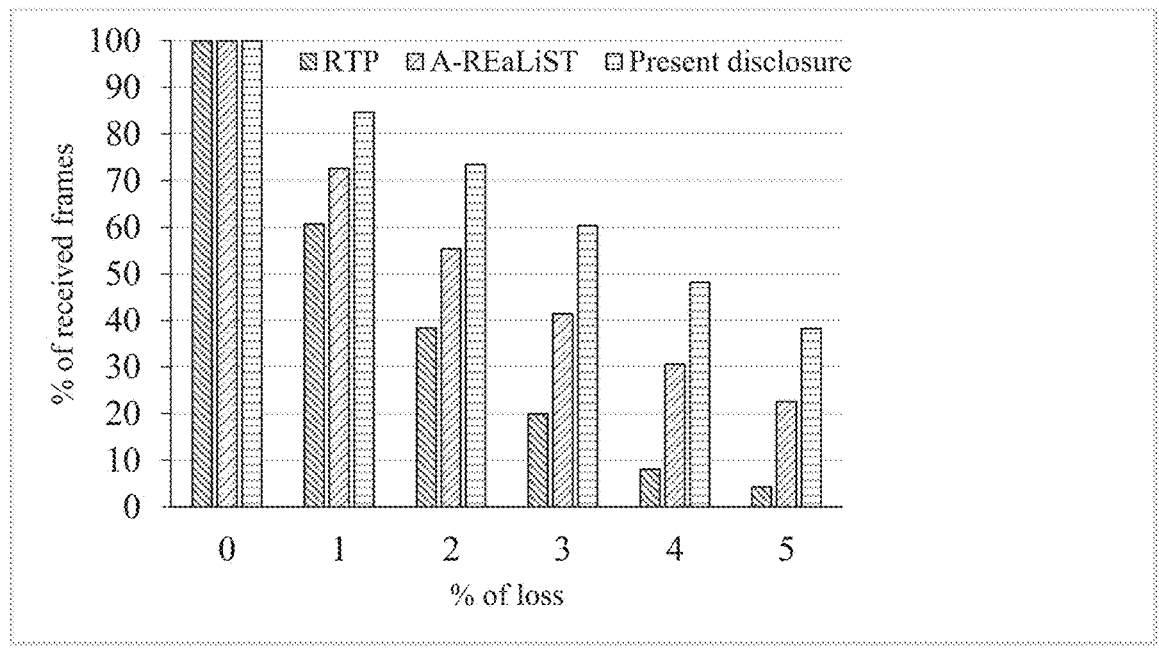
FIG. 6A is a graph showing a comparison of the present disclosure with a real-time transport protocol (RTP) and Adaptive RESTful Real-time Streaming for Things (A-REaLiST), in terms of a percentage (%) of frames (frame rate) received with acceptable QoE

FIG. 6A is a graph showing a comparison of the present disclosure with the real-time transport protocol (RTP) and the Adaptive RESTful Real-time Streaming for Things (A-REaLiST), in terms of a percentage (%) of frames (frame rate) received with acceptable QoE. FIG. 6A shows that the rate of frame reception has significantly increased for the present disclosure, because of the QoE aware frame recovery. A-REaLiST performs better than RTP since in case of loss of the critical packets A-REaLiST may able to recover the critical metadata.

Figure 6B:
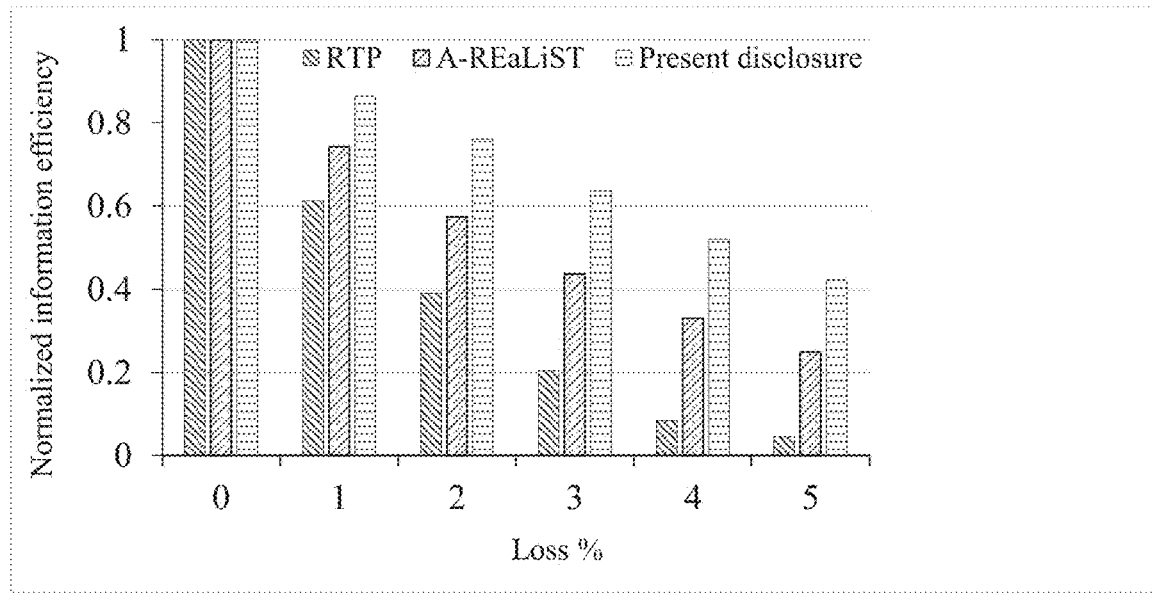
FIG. 6B is a graph showing an information efficiency comparison of the present disclosure with the RTP and the A-REaLiST, in terms of acceptable frames received against the total bandwidth consumption in a normalized scale.

FIG. 6B is a graph showing an information efficiency comparison of the present disclosure with the RTP and the A-REaLiST, in terms of acceptable frames received against the total bandwidth consumption in a normalized scale. Despite best-effort attempt to send packets in real-time, loss of few packets makes the whole frame unacceptable in the QoE consideration. Hence all the consumption in terms of network resources corresponding to that frame is wasted. However, the present disclosure tries to compensate that wastage yielding the better efficiency.

Figure 6C:
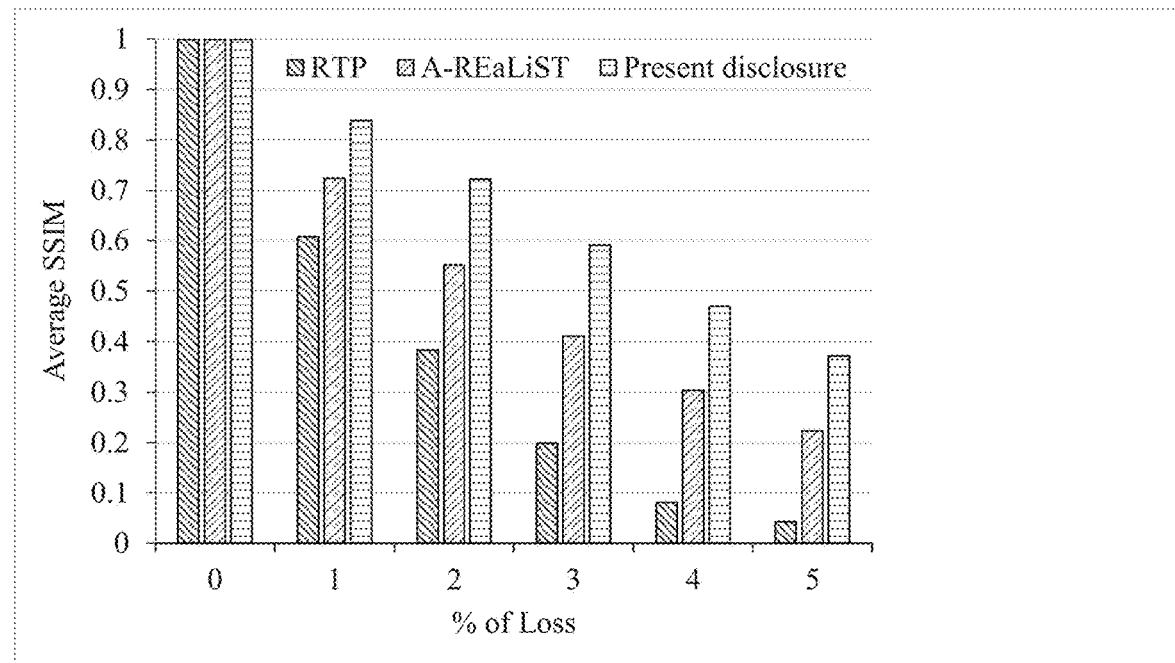
FIG. 6C is a graph showing a comparison of the present disclosure with the RTP and the A-REaLiST, in terms of the average structural similarity (SSIM) of the stream for different percentage of packet losses in the end-to-end channel.

FIG. 6C is a graph showing a comparison of the present disclosure with the RTP and the A-REaLiST, in terms of the average structural similarity (SSIM) of the stream for different percentage of packet losses in the end-to-end channel. This shows how the average SSIM has improved over increasing packet loss percentage, hence the present disclosure exhibits the improved QoE over the RTP and the A-REaLiST.

Figure 6D:
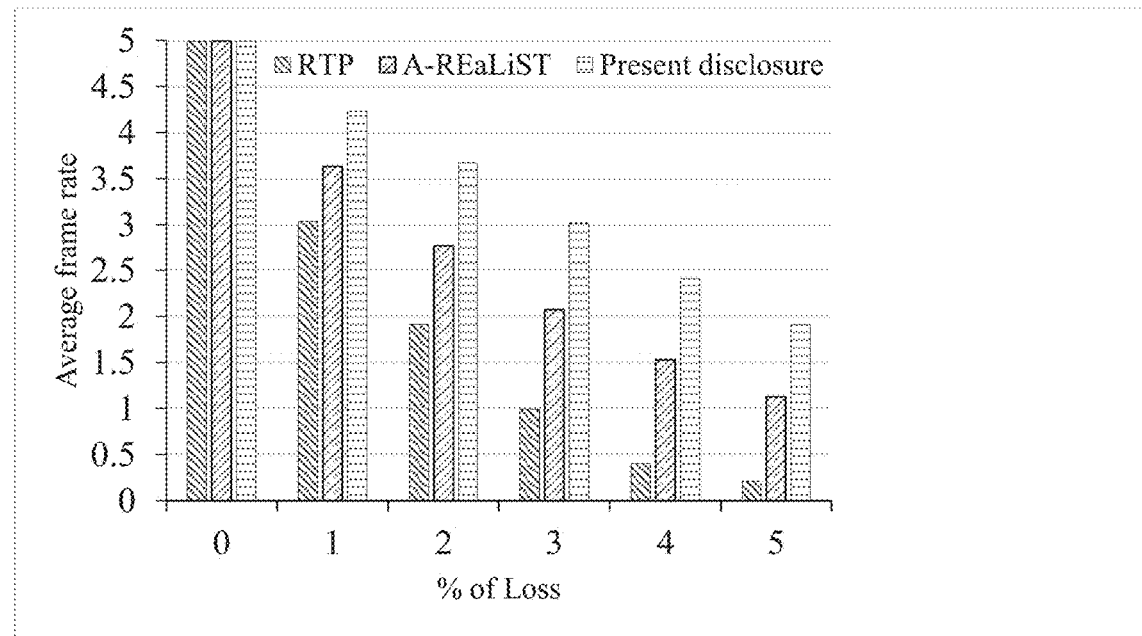
FIG. 6D is a graph showing a comparison of the present disclosure with the RTP and the A-REaLiST, in terms of the average frame rate under lossy conditions.

FIG. 6D is a graph showing a comparison of the present disclosure with the RTP and the A-REaLiST, in terms of the average frame rate under lossy conditions. The graph shows how the present disclosure improves real-time performance by increasing the average frame rate. This is because the present disclosure reduces the rate of frame rejection and is able to push more frames to the play-out buffer in real-time. From FIG. 6A through FIG. 6D, the present disclosure shows the considerable improvement over the RTP and the A-REaLiST.

Figure 7A:
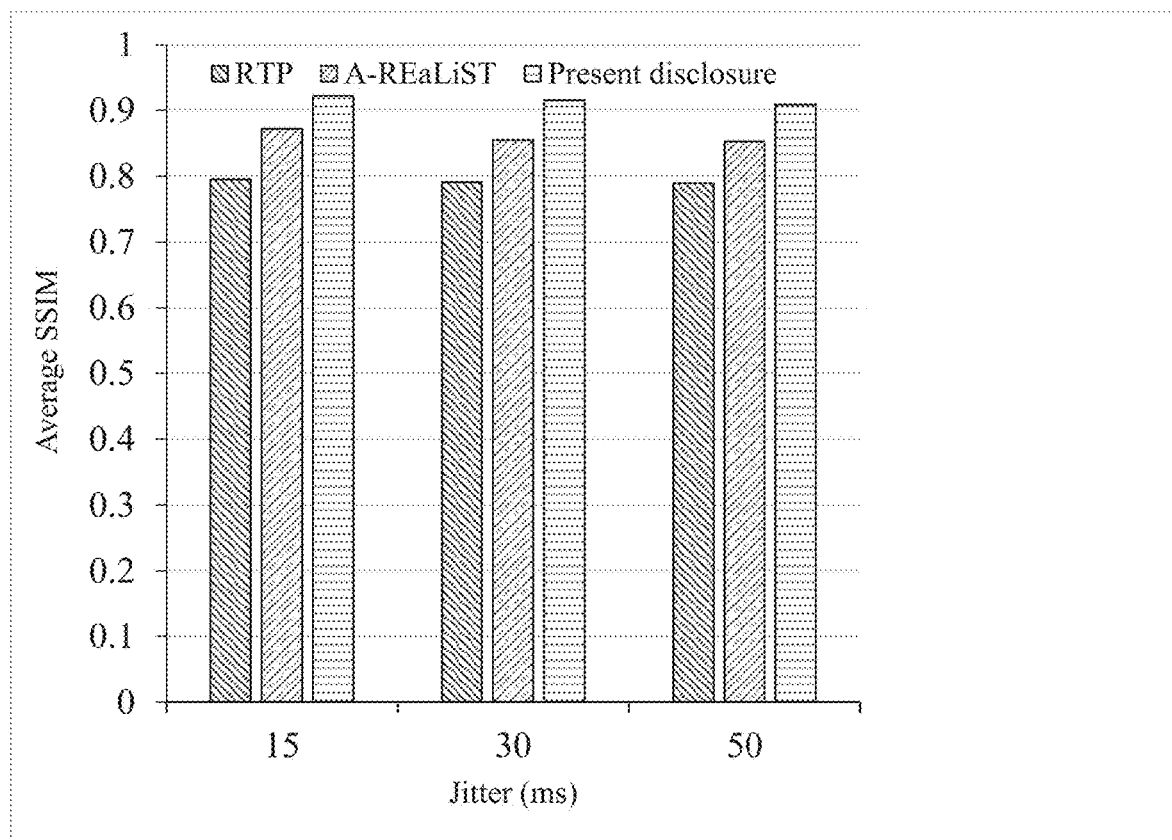
FIG. 7A is a graph showing a comparison of the present disclosure over the RTP and the A-REaLiST, in terms of the average SSIM, in a jittery channel with 0.5% loss average 60 ms delay.
Figure 7B:
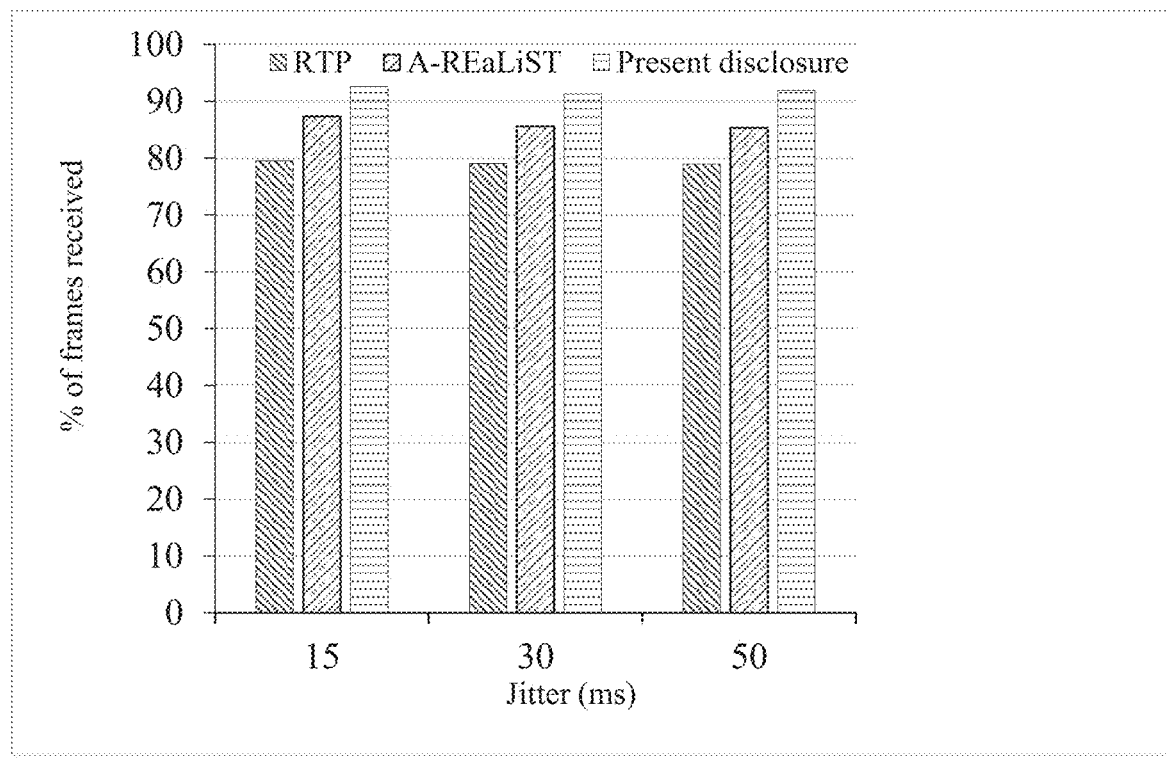
FIG. 7B is a graph showing a comparison of the present disclosure over the RTP and the A-REaLiST, in terms of the rate of receiving acceptable frames, in a jittery channel with 0.5% loss average 60 ms delay.
Figure 8:
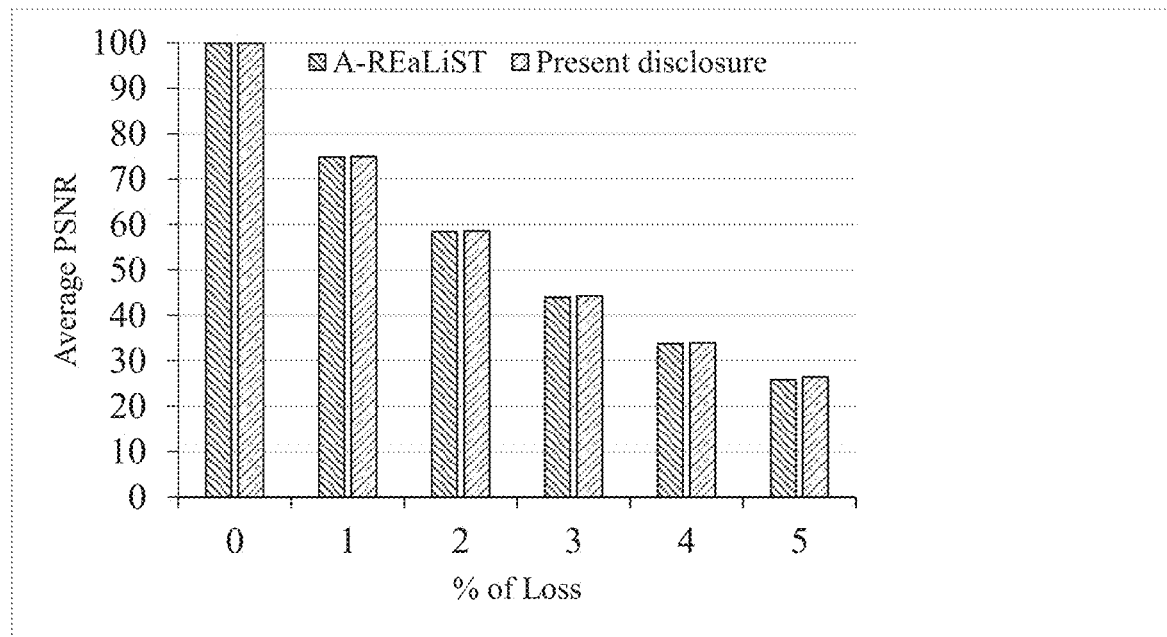
FIG. 8 is a graph showing a comparison of the present disclosure over the A-REaLiST, in terms of the peak signal-to-noise ratio (PSNR).

FIG. 7A is a graph showing a comparison of the present disclosure over the RTP and the A-REaLiST, in terms of the average SSIM, in a jittery channel with 0.5% loss average 60 ms delay. FIG. 7B is a graph showing a comparison of the present disclosure over the RTP and the A-REaLiST, in terms of the rate of receiving acceptable frames, in a jittery channel with 0.5% loss average 60 ms delay. From, FIG. 7A and FIG. 7B, the present disclosure is having the improved overall QoE. Based on the performance, the present disclosure is efficient in terms of maintaining the QoE for extremely delay-sensitive applications. Finally, FIG. 8 is a graph showing a comparison of the present disclosure over the A-REaLiST, in terms of the peak signal-to-noise ratio (PSNR). From FIG. 8, the present disclosure has expectedly no impact on PSNR because, while retrieving the QoE, the lost bits are not retrieved according to the present disclosure. Rather, the lost entropy is compensated through encoded zeros (0's) to regain the structural continuity. Thus FIG. 8 shows an interesting insight on how the QoE is improved without attempting to regain the lost bits through BEC or FEC.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims (when included in the specification), the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method comprising the steps of:

receiving, via one or more hardware processors, a real-time video being acquired by a video acquisition unit installed at a video producing unit;

encoding, via the one or more hardware processors, the real-time video, to obtain one or more encoded frames, using an encoding technique, wherein each encoded frame of the one or more encoded frames comprises one or more minimum coded unit (MCU) blocks indicating encoded visual information, and a metadata;

segmenting, via the one or more hardware processors, each encoded frame into one or more packets using a segmentation algorithm, wherein each packet of the one or more packets comprises an integer number of MCU blocks with a packet size, wherein the maximum packet size of each packet is limited by a maximum transmission unit (MTU) size;

identifying, via the one or more hardware processors, one or more critical packets and one or more non-critical packets from the one or more packets, based on the metadata present in the one or more packets, wherein the one or more critical packets are critical for rendering the real-time video at a video consuming unit;

transmitting, via the one or more hardware processors, the one or more critical packets and the one or more non-critical packets, over a network communication channel;

parsing the one or more critical packets and the one or more non-critical packets, received at the video consuming unit; and reconstructing the real-time video, while playing-out at the video consuming unit, by storing the one or more critical packets and the one or more non-critical packets in a play-out buffer in an order received, using a rendering algorithm, to maintain a Quality of Experience (QoE) of the real-time video, where in the rendering algorithm comprises:

identifying one or more missing non-critical packets out of the one or more non-critical packets, based on an associated position indicator corresponding to an associated timestamp;

identifying one or more missing MCU blocks associated with each missing non-critical packet, based on a payload specific header of the next non-critical packet successfully received and the payload specific header of the previous non-critical packet successfully received;

compensating DC components of each missing MCU block with encoded zeros, while decoding, to obtain corresponding filled MCU blocks and corresponding filled non-critical packets, wherein the encoded zeros are obtained from the corresponding critical packet, the filled non-critical packets are used for near-faithful structural restoration of the encoded frame after the decodina; and replacing the one or more missing non-critical packets with the respective filled non-critical packets, in the play-out buffer.

2. The method of claim 1, wherein segmenting each encoded frame into the one or more packets, using the segmentation algorithm, comprises:

initializing a packet buffer with a current packet size, for a current packet, wherein a maximum current packet size is limited to the maximum transmission unit (MTU) size;

truncating remaining metadata at a current packet boundary and leaving rest of the remaining metadata for putting in a next packet, if a sum of the current packet size and a remaining metadata size is greater than the maximum current packet size, else putting the remaining metadata in the current packet;

discarding a next MCU block for putting in the next packet and inserting padding bits for byte alignment to the current packet, if: (i) the next MCU block is available, and (ii) a sum of the current packet size and a next MCU block size is greater than the maximum current packet size; and putting the next MCU block in the current packet, if the sum of the current packet size and the next MCU block size is less than or equal to the maximum current packet size.

3. The method of claim 1, wherein transmitting the one or more critical packets and the one or more non-critical packets, utilizes an application protocol with one of the header fields having a header_option to indicate a presence of a payload specific header which comprises two unsigned 16-bit fields each indicating a start_MCU_index and an end_MCU_index, and an unsigned 8-bit field indicating a padded_bit_length for byte-alignment.

4. The method of claim 1, wherein identifying the one or more critical packets and the one or more non-critical packets from the one or more packets, comprises identifying each packet having the metadata as a critical packet and identifying each packet not having the metadata as a non-critical packet.

5. A system comprising:

one or more hardware processors;

one or more Input/Output (I/O) interfaces; and the memory operatively coupled to one or more hardware processors for storing instructions configured for execution by the one or more hardware processors, the instructions being comprised in:

a video producing unit configured to:

receive a real-time video being acquired by a video acquisition unit;

encode the real-time video, to obtain one or more encoded frames, using an encoding technique, wherein each encoded frame of the one or more encoded frames comprises one or more minimum coded unit (MCU) blocks indicating encoded visual information, and a metadata;

segment each encoded frame into one or more packets using a segmentation algorithm, wherein each packet of the one or more packets comprises an integer number of MCU blocks with a packet size, wherein the maximum packet size of each packet is limited by a maximum transmission unit (MTU) size;

identify one or more critical packets and one or more non-critical packets from the one or more packets, based on the metadata present in the one or more packets, wherein the one or more critical packets are critical for rendering the real-time video at a video consuming unit;

transmit the one or more critical packets and the one or more non-critical packets, over a network communication channel;

parse the one or more critical packets and the one or more non-critical packets, received at the video consuming unit; and reconstruct the real-time video, while playing-out at the video consuming unit, by storing the one or more critical packets and the one or more non-critical packets in a play-out buffer in an order received, using a rendering algorithm, to maintain a Quality of Experience (QoE) of the real-time video, where in the rendering algorithm comprises:

identifying one or more missing non-critical packets out of the one or more non-critical packets, based on an associated position indicator corresponding to an associated timestamp;

identifying one or more missing MCU blocks associated with each missing non-critical packet, based on a payload specific header of the next non-critical packet successfully received and the payload specific header of the previous non-critical packet successfully received;

compensating DC components of each missing MCU block with encoded zeros, while decodina, to obtain corresponding filled MCU blocks and corresponding filled non-critical packets, wherein the encoded zeros are obtained from the corresponding critical packet, the filled non-critical packets are used for near-faithful structural restoration of the encoded frame after the decodina; and replacing the one or more missing non-critical packets with the respective filled non-critical packets, in the lay-out buffer.

6. The system of claim 5, wherein the video producing unit is further configured to segment each encoded frame into the one or more packets using the segmentation algorithm, by:
initializing a packet buffer with a current packet size, for a current packet, wherein a maximum current packet size is limited to the maximum transmission unit (MTU) size;
truncating remaining metadata at a current packet boundary and leaving rest of the remaining metadata for putting in a next packet, if a sum of the current packet size and a remaining metadata size is greater than the maximum current packet size, else putting the remaining metadata in the current packet;
discarding a next MCU block for putting in the next packet and inserting padding bits for byte alignment to the current packet, if: (i) the next MCU block is available, and (ii) a sum of the current packet size and a next MCU block size is greater than the maximum current packet size; and
putting the next MCU block in the current packet, if the sum of the current packet size and the next MCU block size is less than or equal to the maximum current packet size.

7. The system of claim 5, wherein the video producing unit is further configured to transmit the one or more critical packets and the one or more non-critical packets, by utilizing an application protocol with one of the header fields having a header_option to indicate a presence of a payload specific header which comprises two unsigned 16-bit fields each indicating a start_MCU_index and an end_MCU_index, and an unsigned 8-bit field for indicating a padded_bit_length for byte-alignment.

8. The system of claim 5, wherein the video producing unit is further configured to identify one or more critical packets and the one or more non-critical packets from the one or more packets, by identifying each packet having the metadata as a critical packet and identifying each packet not having the metadata as a non-critical packet.

9. A computer program product comprising a non-transitory computer readable medium having a computer readable program embodied therein, wherein the computer readable program, when executed on a computing device, causes the computing device to:
receive a real-time video being acquired by a video acquisition unit;
encode the real-time video, to obtain one or more encoded frames, using an encoding technique, wherein each encoded frame of the one or more encoded frames comprises one or more minimum coded unit (MCU) blocks indicating encoded visual information, and a metadata;
segment each encoded frame into one or more packets using a segmentation algorithm, wherein each packet of the one or more packets comprises an integer number of MCU blocks with a packet size, wherein the maximum packet size of each packet is limited by a maximum transmission unit (MTU) size;
identify one or more critical packets and one or more non-critical packets from the one or more packets, based on the metadata present in the one or more packets wherein the one or more critical packets are critical for rendering the real-time video at a video consuming unit;
transmit the one or more critical packets and the one or more non-critical packets, over a network communication channel;
parse the one or more critical packets and the one or more non-critical packets, received at the video consuming unit; and
reconstruct the real-time video, while playing-out at the video consuming unit, by storing the one or more critical packets and the one or more non-critical packets in a plav-out buffer in an order received, using a rendering algorithm, to maintain a Quality of Experience (QoE) of the real-time video, where in the rendering algorithm comprises:
identifying one or more missing non-critical packets out of the one or more non-critical packets, based on an associated position indicator corresponding to an associated timestamp;
identifying one or more missing MCU blocks associated with each missing non-critical packet, based on a payload specific header of the next non-critical packet successfully received and the payload specific header of the previous non-critical packet successfully received;
compensating DC components of each missing MCU block with encoded zeros, while decodina, to obtain corresponding filled MCU blocks and corresponding filled non-critical packets, wherein the encoded zeros are obtained from the corresponding critical packet, the filled non-critical packets are used for near-faithful structural restoration of the encoded frame after the decodina; and
replacing the one or more missing non-critical packets with the respective filled non-critical packets, in the play-out buffer.

* * * * *